United States Patent [19]
Vensel

[11] 3,964,600
[45] June 22, 1976

[54] NATURAL FREQUENCY ADJUSTMENT FOR VIBRATORY FEEDER

[75] Inventor: Perry M. Vensel, Penn Run, Pa.
[73] Assignee: FMC Corporation, San Jose, Calif.
[22] Filed: Oct. 17, 1974
[21] Appl. No.: 515,784

[52] U.S. Cl. .......................................... 198/220 CA
[51] Int. Cl.² ........................................ B65G 27/00
[58] Field of Search ............... 198/220 CA, 220 BA, 198/220 BC, 220 BB, 220 CB

[56] References Cited
UNITED STATES PATENTS

| | | | |
|---|---|---|---|
| 315,824 | 4/1885 | Patten | 198/220 CA |
| 3,063,546 | 11/1962 | Sherwen | 198/220 CA |
| 3,087,603 | 4/1963 | Petrea | 198/220 CA |
| 3,459,292 | 8/1969 | Piroutek | 198/220 CA |
| 3,700,094 | 10/1972 | Parr | 198/220 BC |
| 3,757,932 | 9/1973 | Baljet et al. | 198/220 BC |

FOREIGN PATENTS OR APPLICATIONS

| | | | |
|---|---|---|---|
| 125,645 | 2/1900 | Germany | 198/220 CA |
| 174,549 | 1/1964 | U.S.S.R. | 198/220 CA |

Primary Examiner—Frank E. Werner
Assistant Examiner—James M. Slattery
Attorney, Agent, or Firm—C. E. Tripp

[57] ABSTRACT

An article feeder has a base and a frame mounted on the base with a bowl, which receives and dispenses articles, secured to the frame. The frame and bowl assembly constitute one mass of a two mass system, and the base constitutes the other mass of the system. Several sets of leaf springs are secured by clamps between the frame and the base to support the frame and bowl for rotational oscillation by a motor mounted on the base. The sets of leaf springs provide the total spring coupling between the frame and bowl assembly and the base. These sets of leaf springs are supported adjacent one clamped end thereof by adjustable supports that can alter the effective lengths of the leaf spring sets to change the torsional natural frequency of the two mass system in small increments without disturbing the clamps mounting the sets of leaf springs.

3 Claims, 4 Drawing Figures

FIG_1
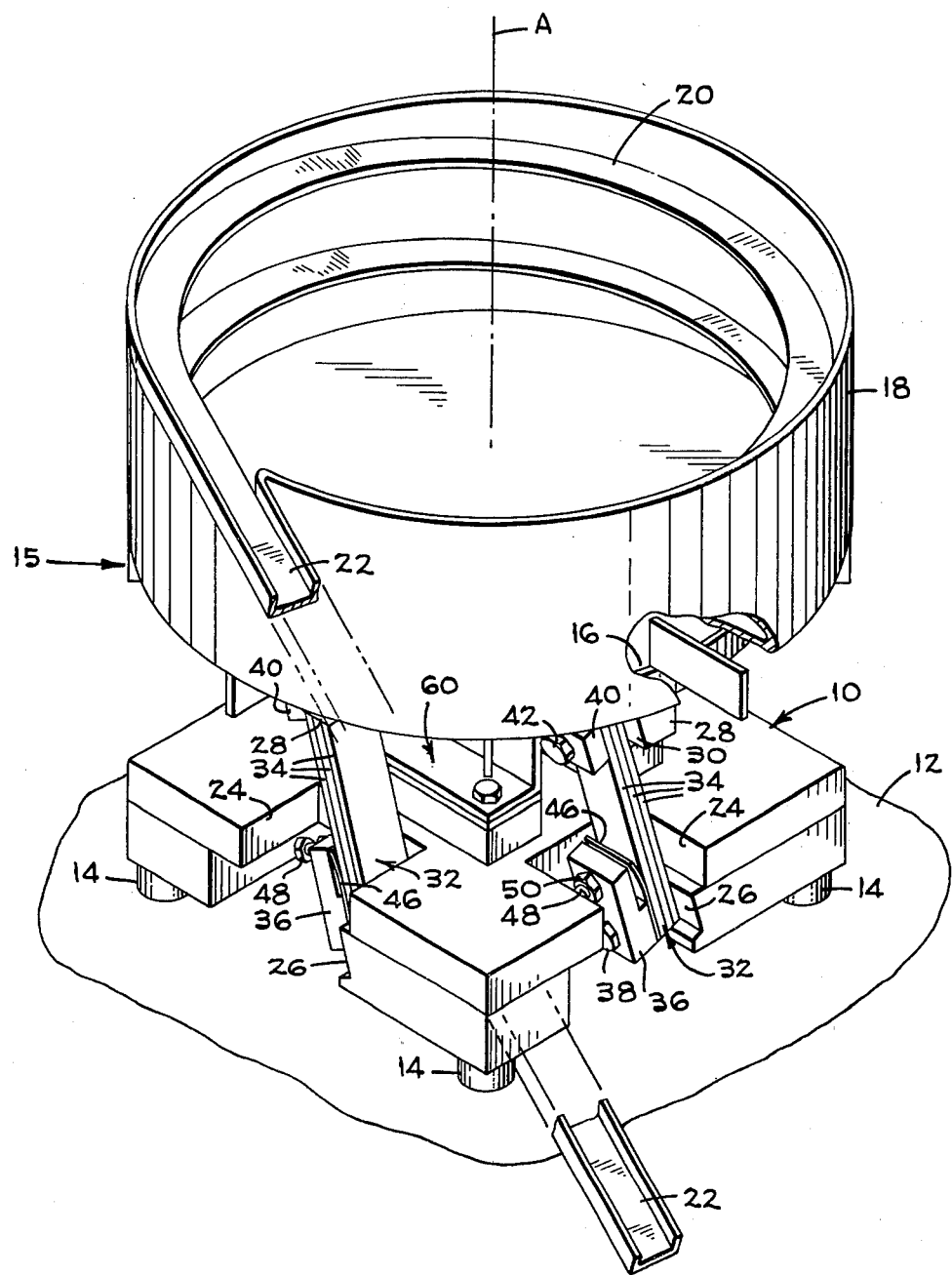

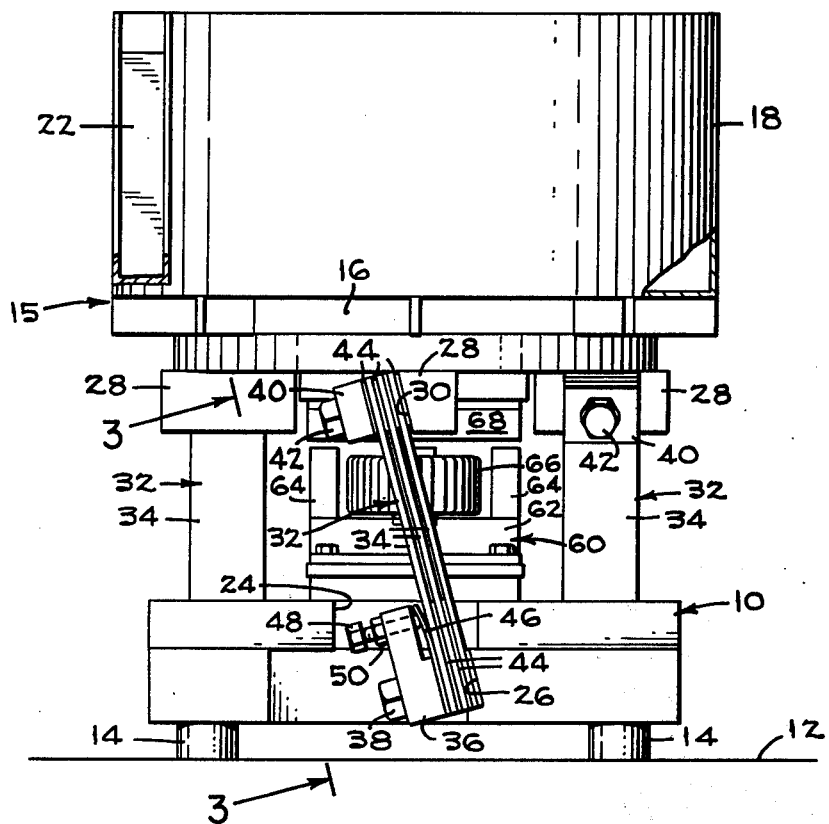
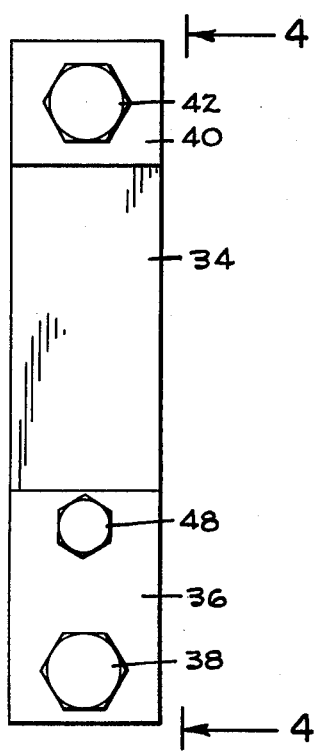
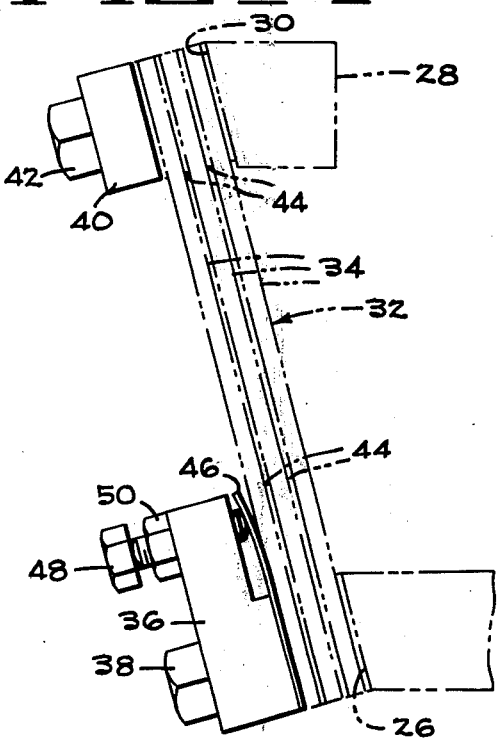

NATURAL FREQUENCY ADJUSTMENT FOR VIBRATORY FEEDER

BACKGROUND OF THE INVENTION

1. Field of the Invention

The present invention relates to a two-mass vibratory feeder and more particularly, to a mechanism for changing the natural frequency of the feeder.

2. Description of the Prior Art

In a vibratory feeder, a frame, which carries an article or material container, is supported by leaf springs secured to a base. The base, springs and the frame (with container) constitute a spring-coupled two-mass system in which the frame and container (which constitute one mass of the system) is oscillated by a motor with respect to the base (which constitutes the other mass of the system). The motor creates a vibratory driving force of a predetermined frequency, and it is desirable to have the natural frequency of the spring-coupled two-mass system near the frequency of the motor to minimize the power consumed in the feeding operation.

It is therefore desirable to be able to adjust the natural frequency of the system in order to "tune" the two-mass system for most efficient operation. One previously known method of adjusting the frequency of the system is to modify the spring system.

Usually, the spring system by which the frame is mounted to the base consists of sets of leaf springs clamped to both the frame and the base. The removal (or addition) of a leaf from a set is not only difficult and awkward, but it frequently results in too great a change in the frequency of the system.

Accordingly, it is one object of the present invention to provide an improvement in a spring system for a feeder so that the spring system can be easily modified to change the natural frequency of the feeder.

It is another object of the present invention to provide an improvement in a spring system for a feeder so that adjustment of the frequency of the feeder in small increments can easily be made.

It is yet another object of the present invention to provide an improved spring system for a spring-coupled two-mass vibratory feeder in which fine adjustment of the torsional natural frequency of the system can be easily effected.

SUMMARY OF THE INVENTION

In accordance with the present invention leaf springs are connected between a frame and a base of a two-mass vibratory feeder and means are provided for changing the effective length of the leaf springs to alter the natural frequency of the feeder. In the preferred embodiment of the invention, wherein the frame is supported with respect to the base by a plurality of sets of leaf springs which are clamped to the base and the frame, means for changing the effective length of a leaf spring set to alter the natural frequency of the feeder are provided for each set of leaf springs. Such means include an adjustable support located adjacent one end of the leaf spring set to limit the deflection of the leaf spring set in at least one direction of oscillating movement from a rest position. The adjustable support limits the deflection of the leaf spring set along a partial length thereof and can be manipulated to change by fine increments the partial lengths along the leaf spring set where deflection of the spring set is limited. The frequency of the feeder increases with a decrease in the effective length of the leaf spring sets and thus, the adjustable support, which changes the effective length of a leaf spring set, can be used to make fine adjustments in torsional natural frequency of a spring coupled two-mass vibratory feeder for optimum feeding conditions when the feeder is manufactured or serviced.

BRIEF DESCRIPTION OF THE DRAWINGS

FIG. 1 is a view in perspective of an article feeder embodying the mechanism of the present invention.
FIG. 2 is a side view of the feeder of FIG. 1.
FIG. 3 is a view taken on the line 3—3 of FIG. 2.
FIG. 4 is a view taken on the lines 4—4 of FIG. 3.

DESCRIPTION OF THE PREFERRED EMBODIMENTS

There is shown in FIG. 1 a spring-coupled two-mass vibratory article feeder having a substantially square base 10 supported on a rigid working surface 12, such as a floor or table, by means of resilient isolating pads 14 secured at each corner to the bottom surface of the base. The feeder includes a frame 16 (FIG. 2) on which a container 18 is secured. The container receives the articles (not shown) to be dispensed, and, as is well understood on the art, the articles are fed, as on track 20, successively out of the container 18 and down the discharge chute 22 when the container is vibrated about a central axis A thereof.

The base 10 constitutes one mass of the spring-coupled, two-mass vibratory article feeder, and the assembly 15 that includes the frame 16 and the container 18 constitute the other mass of the system. The base 10 has four recesses 24 extending inwardly from the four sides, respectively, each recess defined on one side by a seat 26. The frame has four blocks 28 depending therefrom with each block having a seat 30 thereon.

The base 10 and assembly 15 of frame and container are coupled by resilient means in the form of leaf springs. Four sets 32 of leaf springs 34 are mounted between the base 10 and the frame 16. Each set (illustrated with three leaf springs) is clamped, at one end, to the seat 26 in the base by means of a clamp plate 36. A cap screw 38 extends through the clamp plate 36 on each set 32 of springs 34, and is threadedly received in seat 26. Each set 32 of leaf springs is also clamped, at the opposite end, to the seat 30 on the frame by means of a clamp plate 40. A bolt 42 extends through clamp plate 40 and is threadedly received in seat 30. Each set 32 of springs has thin aluminum spacers 44 inserted between adjacent leaf springs 34, as shown in FIGS. 2 and 4, to prevent contact between adjacent springs during operation of the feeder and between the end springs and the seats to distribute the forces from the springs evenly to the seats.

In order to alter the torsional natural frequency of the spring coupled two-mass vibratory feeder for optimum feeding conditions when the feeder is manufactured or serviced, a curved cantilever spring 46 is mounted between the base of the leaf spring set 32 and the clamp plate 36. At the clamp plate, the leaf spring set is tangential with the curved cantilever spring, but the opposite or free end of the cantilever spring curves away from the leaf spring set in one direction of oscillation of the leaf spring set. The clamp plate extends parallel with the leaf spring set but is offset on the side adjacent the cantilever spring to provide the necessary clearance for the curved cantilever spring. An adjustment screw 48 is threadedly fitted through a hole in the clamp plate 36 and contacts the curved portion of the cantilever spring to deflect that portion of the spring in a direction opposite to its normal curvature and toward engagement with the leaf spring set. For each increment the cantilever spring deflects toward the leaf spring set, the cantilever spring supports an increased length of the leaf spring set extending from the end mounting towards the free end of the cantilever spring. Thus, the effective length of the leaf spring set and the torsional natural frequency of the vibratory feeder can be manipulated by turning the adjustment screw. A jam nut 50 is threadedly fitted on the adjustment screw to lock the adjustment screw in a set position and thereby prevent a change in the cantilever spring during operation of the feeder.

A conventional electromagnetic motor 60 is mounted on the base to drive the frame and container in rotational oscillation about the vertical central axis A. The motor has a core 62 with three upstanding legs 64, and the motor has a coil 66 mounted on the center leg. An armature 68 is secured to the bottom of the frame, in closely spaced relation to the top of the core legs. When an alternating current is supplied to the coil 66, the armature, frame and container oscillate about axis A at a predetermined frequency established by the frequency of the current supplied to the coil.

It is desirable to "tune" the vibratory feeder to bring its torsional natural frequency close to the frequency of the motor. One method of changing the natural frequency of the two-mass feeder system, and the system utilized in the present invention, is to change the effective length of the resilient means (that is, the leaf springs 34) by which the frame and container is connected to the base. The shorter the springs, the higher the natural frequency of the system.

In order to increase the natural frequency of the system, the adjustment screw 48 is turned to deflect the cantilever spring 46 toward the spring set 32, increasing the length of the cantilever spring that supports the spring set and thereby decreasing the effective length of the spring set. Since the lower spacers 44 positioned between adjacent leaf springs 34 are the same length as the cantilever spring 46, all leaf springs in the set 32 are limited to the same effective length as the leaf spring adjacent the cantilever spring. When the proper adjustment has been made, the jam nut 50 is tightened against the clamp plate 36 to lock the adjustment screw in the set position. It will be noted that it is not necessary to remove the bolts 38, 42 or the clamp plates 36 and the clamp 40. Thus, the springs are not disturbed, and the frame and container remain firmly supported.

It should also be noted that with the adjustment screw 48, the cantilever spring 46 can be finely adjusted so that smaller changes can be made in the torsional natural frequency of the system than if additional spring leafs were added.

If it is desired to reduce the torsional natural frequency, the jam nut 50 is loosened and the adjustment screw 48 is backed away from the cantilever spring 46 which then deflects away from the spring set 32. Thus, the length of the cantilever spring which supports the spring set is decreased and the effective length of the spring set is increased. When the proper adjustment has been made, the jam nut is again tightened against the clamp plate 36 to lock the adjustment screw in the set position.

It will thus be seen that the present invention relates to an improved spring system for coupling a two-mass vibratory feeder which will facilitate the fine adjustment of the torsional natural frequency of the feeder (particularly, a large feeder) when the feeder is manufactured or serviced.

Although the best mode contemplated for carrying out the present invention has been herein shown and described, it will be apparent that modification and variation may be made without departing from what is regarded to be the subject matter of the invention.

What is claimed is:

1. In an oscillating feeder of the spring coupled two mass torsional pendulum type comprising a base, a frame positioned above the base, at least three sets of leaf springs lying in separate planes inclined from vertical with one end of each leaf spring set being mounted to the base and the opposite end of the leaf spring set being mounted to the frame for supporting the frame on the base in a manner that enables oscillatory movement of the frame in both horizontal and vertical planes, each leaf spring set including a plurality of spaced apart leaf spring arranged to twist about their longitudinal axes and bend transversely of their longitudinal axes without contacting an adjacent leaf spring,
    the improvement therein comprising means clamped adjacent the base end of each set of leaf springs for adjusting the torsional natural frequency of the feeder by changing the effective length of each leaf spring set,
    said adjusting means having a movable member adjacent said feeder base for adjusting said spring effective length while said springs remain mounted and effective for supporting said feeder for continuing feeder operations,
    said leaf springs in each said set remaining in spaced apart relationship.

2. An oscillating feeder as described in claim 1 with said adjusting means including spacers interposed between the leaf springs in each leaf spring set, said spacers extending only a partial length from one end of said leaf spring set towards the opposite end of the set, and with said leaf springs having a remaining length that extends beyond the spacers for a minimum effective length that is capable of developing a maximum frequency vibration of the frame.

3. An oscillating feeder as described in claim 2 with each said movable member including a cantilever spring located adjacent an end of an associated leaf spring set, said cantilever spring being attached to the base end of the spring set and extending towards the opposite end of the set while normally curving outwardly from the set, each said spacer having a length substantially equal to the length of said cantilever spring, and a plurality of adjustment screws with each said adjustment screw being mounted to engage the curved portion of a said cantilever spring for deflecting that portion of said cantilever spring in a direction opposite to its normal curvature and toward engagement with said leaf spring set.

* * * * *